2,831,003
CYCLOBORATE ESTERS OF 16α,17α-DIHYDROXY STEROIDS

Gordon H. Thomas, New Brunswick, N. J., assignor to Olin Mathieson Chemical Corporation, New York, N. Y., a corporation of Virginia No Drawing. Application November 5, 1957
Serial No. 694,527

7 Claims. (Cl. 260—397.45)

This invention relates to, and has for its object the provision of, a method of preparing physiologically active steroids, and to the physiologically active steroids produced thereby.

The steroids of this invention include the cycloborate ester derivatives of 16α,17α-dihydroxy steroids, and more particularly steroids of the general formula

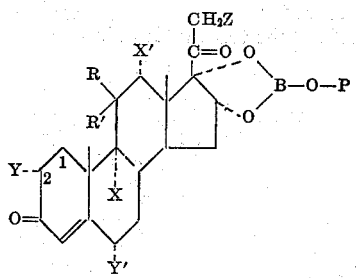

wherein the 1,2-position is saturated or double-bonded; R is hydrogen, R' is β-hydroxy or together R and R' is keto; X and X' are hydrogen, halogen, hydroxy or lower alkoxy, at least one X being hydrogen; Y and Y' are hydrogen or methyl; Z is hydrogen, halogen, hydroxy, or acyloxy; and P is hydrogen, a cation, lower alkyl, or acyl.

The compounds of this invention, wherein P is hydrogen, are prepared by interacting a steroid of the general formula

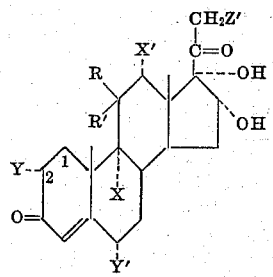

wherein the 1,2-position is saturated or double-bonded; R, R', X, X', Y and Y' are as hereinbefore defined; and Z' is hydrogen, halogen, or hydroxy; with boric acid anhydride. The reaction is preferably carried out by treating a suspension or solution of the steroid with the boric acid anhydride in an organic solvent, such an methanol, at an elevated temperature, such as the reflux temperature of the organic solvent.

The resulting cycloborate derivative can then be neutralized by treatment with a base, such as an alkali metal hydroxide (e. g., sodium hydroxide), ammonium hydroxide, or an alkaline earth metal hydroxide, to yield the corresponding salt (P is a cation). The cycloborate derivative can also be esterified (P is lower alkyl) by treating the borate salt (P is a cation) with a lower alkyl halide (e. g., methyl iodide). The borate can also be converted to a mixed anhydride (P is acyl) by treatment with an acid anhydride (e. g., acetic anhydride) in an organic solvent such as pyridine at an elevated temperature; the reaction resulting in the concomitant acylation of a free 21-hydroxyl group present. Among the suitable reagents for this reaction may be mentioned the anhydrides of hydrocarbon carboxylic acids having less than ten carbon atoms, as exemplified by the lower alkanoic acids (e. g., acetic, propionic, and hexanoic acids), the monocyclic aromatic carboxylic acids (e. g., benzoic acid), the monocyclic aralkanoic acids (e. g., phenacetic and β-phenylpropionic acids), the lower alkenoic acids, the lower cycloalkane carboxylic acids, and the lower cycloalkene carboxylic acids.

Among the suitable starting steroids utilizable in the process of this invention may be mentioned: 16α-hydroxyhydrocortisone, 16α-hydroxycortisone, 16α-hydroxyprednisolone, 16α- hydroxy prednisone,, 9α-halo-16α-hydroxyhydrocortisone (e. g., 9α-fluoro-16α-hydroxyhydrocortisone), 9α-halo-16α-hydroxycortisone, 9α-halo-16α-hydroxyprednisolone (e. g., 9α-fluoro-16α-hydroxyprednisolone), 9α-halo-16α-hydroxyprednisone, 12α-halo-16α-hydroxyhydrocortisone (e. g., 12α-fluoro-16α-hydroxyhydrocortisone) 12α-halo-16α-hydroxycortisone (e. g., 12α-chloro - 16α - hydroxycortisone), 12α - halo - 16α-hydroxyprednisolone, 12α-halo-16α-hydroxyprednisone, 6α-methyl-16α-hydroxyhydrocortisone, 6α-methyl-16α-hydroxycortisone, 6α-methyl-16α-hydroxyprednisolone, 6α-methyl-16α-hydroxyprednisone, 2α-methyl-16α-hydroxyhydrocortisone, 2α-methyl-16α-hydroxycortisone, 9α-halo-6α-methyl-16α-hydroxyhydrocortisone (e. g., 9α-fluoro-6α-methyl-16α-hydroxyhydrocortisone), 9α-halo-6α-methyl-16α-hydroxyprednisolone (e. g., 9α-fluoro-6α-methyl-16α-hydroxyprednisolone), 11β,16α,17α-trihydroxyprogesterone, 11 - keto - 16α,17α - dihydroxyprogesterone, 11β,16α,17α-trihydroxy-1-dehydroprogesterone, 11-keto-16α,17α - dihydroxy - 1 - dehydroprogesterone, 9α - halo-11β,16α,17α-trihydroxyprogesterone (e. g., 9α-fluoro-11β,16α,17α - trihydroxyprogesterone), 9α - halo - 11β, 16α,17α - trihydroxy - 1 - dehydroprogesterone (e. g., 9α - fluoro - 11β,16α,17α-trihydroxy - 1 - dehydroprogesterone), 12α - halo - 11β,16α,17α - trihydroxyprogesterone (e. g., 12α - fluoro - 11β,16α,17α - trihydroxyprogesterone), 12α - halo - 11β,16α,17α - trihydroxy - 1-dehydroprogresterone (e. g., 12α - fluoro - 11β,16α,17α-trihydroxy - 1 - dehydroprogesterone), 21 - halo-11β,16α, 17α-trihydroxyprogesterone (e. g., 21-fluoro-11β,16α, 17α - trihydroxyprogesterone), 21 - halo - 11β,16α,17α-trihydroxy - 1 - dehydroprogesterone, 9α,21 - dihalo - 11β, 16α,17α - trihydroxyprogesterone (e. g., 9α,21 - difluoro-11β,16α,17α - trihydroxyprogesterone), and 9α,21 - dihalo - 6α - methyl - 11β,16α,17α - trihydroxy - 1 - dehydroprogesterone.

Particularly preferred steroid reactants are those wherein the 1,2-position is either saturated or double-bonded, R is hydrogen, R' is β-hydroxy or together R and R' is keto; X and X' are hydrogen, chlorine or fluorine, at least one X being hydrogen; Y and Y' are hydrogen; and Z is hydrogen or hydroxy. These starting steroids can be prepared as described in the U. S. application of Fried, Serial No. 677,205, filed August 9, 1957.

If a 21-hydroxy steroid is employed as a reactant and a 21-ester derivative is the desired product, the corresponding 21-hydroxy steroid can be acylated in the usual manner. Thus, to prepare the preferred 21-acyloxy derivatives wherein the acyl radical corresponds to the acyl radical of a hydrocarbon carboxylic acid of less than ten carbon atoms, either the acyl halide or acid anhydride of a lower alkanoic acid (e. g., acetic, propionic and tert-butyric acid), a monocyclic aryl carboxylic acid (e. g., benzoic and toluic acid), a monocyclic aryl lower alkanoic acid (e. g., phenacetic and β-phenylpropionic acid), a lower alkenoic acid, a cycloalkanecarboxylic acid, or a cycloalkenecarboxylic acid is employed as a reactant.

3

All of the compounds of this invention are physiologically-active substances which possess glucocorticoid and anti-inflammatory activity and hence can be used in lieu of known glucocorticoids such as hydrocortisone and cortisone in the treatment of rheumatoid arthritis; for this purpose, they can be administered in the same manner as hydrocortisone, for example, the dosage being adjusted for the relative potency of the particular steroid.

The following examples are illustrative of the invention (all temperatures being in centigrade):

EXAMPLE 1

*9α-fluoro-Δ⁴-pregnene-11β,16α,17α,21-tetrol-3,20-dione 16α,17α-cycloborate ester*

A solution of 200 mg. of 9α-fluoro-Δ⁴-pregnene-11β,16α,17α,21-tetrol-3,20-dione and 1 g. of boric acid anhydride in 5 ml. of methanol is heated under reflux for one hour. Dilution with 30 ml. of water followed by crystallization of the precipitated material from acetone-hexane gives about 155 mg. of the 16α,17α-cycloborate ester having M. P. greater than 300°;

$\lambda_{max.}^{alc.}$ 238 m$\mu$ ($\epsilon$=16,000); $\lambda_{max.}^{Nujol}$ 2.9, 5.82, 6.10$\mu$

*Analysis.*—Calcd. for $C_{21}H_{28}O_7BF$ (422.25): C, 59.71; H, 6.68; F, 4.50; B, 2.56. Found: C, 60.00; H, 6.79; F, 4.44; B, 2.49.

Neutralization equivalent: 415.

EXAMPLE 2

*9α-fluoro-Δ¹,⁴-pregnadiene-11β,16α,17α,21-tetrol-3,20-dione 16α,17α-cycloborate ester*

A solution of 500 mg. of 9α-fluoro-Δ¹,⁴-pregnadiene-11β,16α,17α,21-tetrol-3,20-dione and 950 mg. of boric acid anhydride in 7 ml. of methanol is heated under reflux for one hour. The solution is then diluted with 7 ml. of water and the precipitated boric acid is filtered off. Addition of 10 ml. of water to the mother liquor, followed by cooling, results in the 16α,17α-cycloborate ester slowly separating from solution. The material is collected and crystallized from acetone-hexane to give a pure sample.

Following the procedures of Examples 1 and 2 but substituting the appropriate starting material, the cycloborate esters of 16α-hydroxyhydrocortisone, 16α-hydroxyprednisolone, 12α-fluoro-16α-hydroxyhydrocortisone, and 12α-fluoro-16α-hydroxyprednisolone can be prepared.

EXAMPLE 3

*Sodium salt of 9α-fluoro-Δ⁴-pregnene-11β,16α,17α,-21-tetrol-3,20-dione 16α,17α-cycloborate ester*

To a cooled solution of 500 mg. of 9α-fluoro-Δ⁴-pregnene-11β,16α,17α,21-tetrol-3,20-dione 16α,17α-cycloborate ester in 20 ml. of methanol is added, under nitrogen, 1.1 ml. of N sodium hydroxide solution. Evaporation of the solvent in vacuo leaves a residue of about 510 mg. of the desired sodium salt.

Similarly, the sodium salt of 9α-fluoro-16α-hydroxyprednisolone 16α,17α-cycloborate ester can be prepared. Furthermore, by substituting other bases for the sodium hydroxide in the procedure of Example 3, the corresponding salts are obtained.

EXAMPLE 4

*9α-fluoro-Δ⁴-pregnene-11β,16α,17α,21-tetrol-3,20-dione 16α,17α-cycloborate methyl ester*

To 500 mg. of the sodium salt of 9α-fluoro-Δ⁴-pregnene-11β,16α,17α,21-tetrol-3,20-dione 16α,17α-cycloborate ester dissolved in 20 ml. of methanol is added 3 ml. of methyl iodide and the mixture is heated for four hours under reflux. The solution is then evaporated in vacuo to half its volume, water is added and the steroids are isolated with chloroform. The chloroform extract is washed with water, dried over sodium sulfate and evaporated to dryness in vacuo. Crystallization of the residue from acetone-hexane gives a pure sample of the desired 9α-fluoro-Δ⁴-pregnene-11β,16α,17α,21-tetrol-3,20-dione 16α,17α-cycloborate methyl ester.

Similarly, 9α-fluoro-16α-hydroxyprednisolone 16α,17α-cycloborate methyl ester can be prepared from the sodium salt of 9α-fluoro-16α-hydroxyprednisolone 16α,17α-cycloborate ester. Furthermore, upon substituting other lower alkyl iodides, such as ethyl iodide, for the methyl iodide in the procedure of Example 4, the corresponding lower alkyl esters (e. g., ethyl ester) are obtained.

The invention may be otherwise variously embodied within the scope of the appended claims.

What is claimed is:

1. A steroid of the general formula

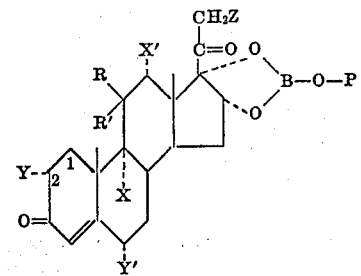

wherein the 1,2-position is saturated or double-bonded, R is hydrogen, R' is β-hydroxy and together R and R' is keto; X and X' are selected from the group consisting of hydrogen, halogen, hydroxy and lower alkoxy, at least one X being hydrogen; Y and Y' are selected from the group consisting of hydrogen and methyl; Z is selected from the group consisting of hydrogen, halogen, hydroxy and acyloxy; and P is selected from the group consisting of hydrogen, cation, lower alkyl, and acyl.

2. 9α - fluoro - 16α - hydroxyhydrocortisone 16α,17α-cycloborate ester.

3. 9α - fluoro - 16α - hydroxyprednisolone 16α,17α-cycloborate ester.

4. An alkali metal salt of 9α-fluoro-16α-hydroxyhydrocortisone 16α,17α-cycloborate ester.

5. The sodium salt of 9α-fluoro-16α-hydroxyhydrocortisone 16α,17α-cycloborate ester.

6. 9α - fluoro - 16α - hydroxyhydrocortisone 16α,17α-cycloborate lower alkyl ester.

7. 9α - fluoro - 16α - hydroxyhydrocortisone 16α,17α-cycloborate methyl ester.

No references cited.